United States Patent Office 2,801,954
Patented Aug. 6, 1957

2,801,954

PREPARATION OF STARCH FROM STARCH BEARING PLANT MATERIALS BY PECTIC ENZYMES

Manayath Damodaran and Inderjit Babbar, Poona, India, assignors to Council of Scientific and Industrial Research, New Delhi, India No Drawing. Application November 18, 1953, Serial No. 392,997

12 Claims. (Cl. 195—4)

This invention relates to the production of starch from starch bearing plant materials.

Starch is obtained from starch bearing plant materials by rupturing the plant cells in which the starch granules are enclosed in their natural state of occurrence. The yield of starch is dependent upon the completeness with which the cell walls are disintegrated, and in the existing processes starch granules are liberated from the cells by repeated mechanical grinding in specially designed grinders. This not only involves expensive mechanical equipment and great expenditure of power but is also by no means completely successful especially with tubers such as potato, tapioca and sweet potato; about 10 to 15% of the starch usually remains unextracted. Severe mechanical treatments adopted for increasing starch yields have a deleterious effect on the properties of the starch produced, technically desirable physical properties such as paste viscosity being adversely affected.

Although there are references in literature to microbiological processes for the manufacture of starch, none of the micro-biological processes hitherto proposed appear to have passed into commercial practice, and to our knowledge there is no process on record which employs enzymes for the manufacture of starch from starch-bearing plant materials.

In the process now developed by us starch is liberated from tubers by dissolving the cell wall substance by the use of enzymes derived from certain micro-organisms. Enzymes derived from *Aspergillus aureas* have been found to be particularly suitable, and the enzyme liberated by a strain of this micro-organism which is in our possession has been found to be most active.

Enzymes derived from other micro-organisms such as *Aspergillus niger*, *Aspergillus wentii*, *Botrytis cinera*, *Penicillium chrysogenum* and *Rhizopus tritici*, have also been found suitable, though not with the same potency as those derived from *Aspergillus aureus*.

Different strains of the same organism are likely to exhibit differences in their capacity to hydrolyse pectic substances, and the suitability of any particular strain can only be ascertained by experimentation.

The culture medium may be a synthetic composition or one prepared from a previous batch of disintegrated starch tubers, consisting of the wash liquor used for separating starch from the fibrous residue. *Aspergillus aureus* grows readily on the latter medium and gives a culture filtrate which can be directly used as enzyme preparation for rupturing the cell wall substance. It is a fact of special practical significance that the enzyme employed in the process is prepared from the waste liquors in starch production. The fact that *Aspergillus aureus* thrives on this medium and secretes the enzyme is a crucial factor for the commercial success of this process, and for a large scale production of the enzyme, the wash liquor from disintegrated tubers is the only economical medium.

By way of example, the process according to the invention may be carried out as follows, in the case of tapioca tubers:

A tested strain of *Aspergillus aureus* is cultivated in an appropriate medium containing pectic substances. A satisfactory medium for the initial culture is made up as follows:

| | | |
|---|---|---|
| Potassium di-hydrogen phosphate | percent | 0.1 |
| Ammonium sulphate | do | 0.1 |
| Magnesium sulphate | do | 0.05 |
| Pectin | do | 2.0 |
| pH | | 3.2 |

For the subsequent operations the wash liquid from the macerated tapioca on which the enzyme solution has already been allowed to act is used as the culture medium with the addition of the minerals in the proportions mentioned above. Growth of the organism is allowed to take place at a temperature of 30° C. under submerged conditions with agitation. After four days the culture fluid is filtered off and is either used directly, or converted into solid preparations by precipitation with acetone, alcohol or ammonium sulphate for subsequent use.

The tapioca tuber is washed and peeled in the usual manner and then minced through a mincer. To the minced mass the enzyme solution prepared as above is added in a proportion of 3 litre enzyme solution for 1 kg. of minced tuber, pH is adjusted to 3.2 with hydrochloric acid; and sulphur dioxide is added to the mass in a concentration of .0008 gm. $SO_2$ per 100 ml. liquid (0.01% by volume of saturated solution of $SO_2$ at 28° C.). The mixture is kept gently stirred for 40 hours at 37° C. At the end of this time the liberated starch is separated by passing the slurry through sieves in the usual manner. The supernatant liquid after the starch has settled is used for preparing the culture medium for the growth of *Aspergillus aureus*. The residual fibre still containing unextracted starch is ground for a short time and submitted once more to the action of the enzyme for a further period of 30–40 hours. Liberation of starch after the second treatment is practically complete, and the residual fibre usually contains less than 5% starch.

The method described above with reference to tapioca is applicable to other tubers also, as the cell wall substances of tuber and plant materials are, generally speaking, of similar composition.

The special advantages of the method according to this invention are (i) a higher yield of starch with much smaller expenditure of mechanical energy, (ii) simplicity and ease of operation, and (iii) mildness of the treatment which yields a better quality of starch. The starch granules not being subjected to severe mechanical treatment settle better in the process of separation and also retain all the advantageous physical characteristics required in prime starch.

What we claim is:

1. A method of recovering starch from starch bearing plant materials in which the starch is at least partly enveloped by pectic substances, comprising the steps of treating said plant material with pectic enzymes obtained from a culture of a pectic enzyme-producing microorganism belonging to the group consisting of *Aspergillus aureus*, *Aspergillus niger*, *Aspergillus wentii*, *Botrytis cinera*, *Penicillium chrysogenum* and *Rhizopus tritici* whereby the pectic substances enveloping said starch are at least partly dissolved, thus liberating the starch without substantially altering its condition; and separating the thus liberated starch from the remainder of the reaction mass.

2. A method of recovering starch from starch bearing plant materials in which the starch is at least partly enveloped by pectic substances, comprising the steps of treating said plant material with pectic enzymes obtained from a culture of a pectic enzyme-producing *Aspergillus aureus* whereby the pectic substances enveloping said starch are at least partly dissolved, thus liberating the starch without substantially altering its condition; and separating the thus liberated starch from the remainder of the reaction mass.

3. A method of recovering starch from starch bearing tuber plant materials in which the starch is at least partly enveloped by pectic substances, comprising the steps of treating said plant material with pectic enzymes obtained from a culture of a pectic enzyme-producing micro-organism belonging to the group consisting of *Aspergillus aureus, Aspergillus niger, Aspergillus wentii, Botrytis cinera, Penicillium chrysogenum* and *Rhizopus tritici*, whereby the pectic substances enveloping said starch are at least partly dissolved, thus liberating the starch without substantially altering its condition; and separating the thus liberated starch from the remainder of the reaction mass.

4. A method of recovering starch from starch bearing materials derived from plants belonging to the group consisting of potato, tapioca and sweet potato, in which the starch is at least partly enveloped by pectic substances, comprising the steps of treating said plant material with pectic enzymes obtained from a culture of a pectic enzyme-producing micro-organism belonging to the group consisting of *Aspergillus aureus, Aspergillus niger, Aspergillus wentii, Botrytis cinera, Penicillium chrysogenum* and *Rhizopus tritici*, whereby the pectic substances enveloping said starch are at least partly dissolved, thus liberating the starch without substantially altering its condition; and separating the thus liberated starch from the remainder of the reaction mass.

5. A method of recovering starch from starch bearing plant materials in which the starch is at least partly enveloped by pectic substances, comprising the steps of mincing said plant portions; adding pectic enzymes obtained from a culture of a pectic enzyme-producing micro-organism belonging to the group consisting of *Aspergillus aureus, Aspergillus niger, Aspergillus wentii, Botrytis cinera, Penicillium chrysogenum* and *Rhizopus tritici*, to said minced plant portions; adjusting the pH of the mass including the pectic enzymes and the minced plant portions to approximately 3.2; stirring said mass at a temperature of approximately 37° C., for a period of time sufficient to at least partly dissolve the pectic substances enveloping said starch, thus liberating said starch without substantially altering its condition; and separating the thus liberated starch from the remainder of said mass.

6. A process as defined in claim 5 in which the remainder of said minced plant portions after separating the freed starch therefrom are ground; and said ground remainder is further treated in the same manner as the minced plant portions as defined in claim 5.

7. A method of recovering starch from starch bearing plant materials in which the starch is at least partly enveloped by pectic substances, comprising the steps of mincing said plant portions; adding a pectic enzyme solution obtained from a culture of a pectic enzyme-producing micro-organism belonging to the group consisting of *Aspergillus aureus, Aspergillus niger, Aspergillus wentii, Botrytis cinera, Penicillium chrysogenum* and *Rhizopus tritici*, to said minced plant portions; adjusting the pH of the mass including the pectic enzyme solution and the minced plant portions to approximately 3.2; stirring said mass at a temperature of approximately 37° C. for approximately 40 hours, whereby the pectic substance enveloping said starch are at least partly dissolved, thus liberating said starch without substantially altering its condition; and separating the thus liberated starch from the remainder of said mass.

8. A method of recovering starch from starch bearing plant materials in which the starch is at least partly enveloped by pectic substances, comprising the steps of mincing said plant portions; adding a pectic enzyme solution obtained from a culture of a pectic enzyme-producing micro-organism belonging to the group consisting of *Aspergillus aureus, Aspergillus niger, Aspergillus wentii,*

*Botrytis cinera, Penicillium chrysogenum* and *Rhizopus tritici*, to said minced plant portions; adjusting the pH of the mass including the pectic enzyme solution and the minced plant portions with hydrochloric acid to approximately 3.2; stirring said mass at a temperature of approximately 37° C. for approximately 40 hours, whereby the pectic substances enveloping said starch are at least partly dissolved, thus liberating said starch without substantially altering its condition; and separating the thus liberated starch from the remainder of said mass.

9. A method of recovering starch from starch bearing plant materials in which the starch is at least partly enveloped by pectic substances, comprising the steps of mincing said plant portions; adding a pectic enzyme solution obtained from a culture of a pectic enzyme-producing micro-organism belonging to the group consisting of *Aspergillus aureus, Aspergillus niger, Aspergillus wentii, Botrytis cinera, Penicillium chrysogenum* and *Rhizopus tritici*, to said minced plant portions in a proportion of approximately 3 liters of pectic enzyme solution for each kilogram of minced plant portions; adjusting the pH of the mass including the pectic enzyme solution and the minced plant portions to approximately 3.2; stirring said mass at a temperature of approximately 37° C. for approximately 40 hours, whereby the pectic substances enveloping said starch are at least partly dissolved, thus liberating said starch without substantially altering its condition; and separating the thus liberated starch from the remainder of said mass.

10. A method of recovering starch from starch bearing plant materials in which the starch is at least partly enveloped by pectic substances, comprising the steps of mincing said plant portions; adding a pectic enzyme solution obtained from a culture of a pectic enzyme-producing micro-organism belonging to the group consisting of *Aspergillus aureus, Aspergillus niger, Aspergillus wentii, Botrytis cinera, Penicillium chrysogenum* and *Rhizopus tritici*, to said minced plant portion in a proportion of approximately 3 liters of pectic enzyme solution for each kilogram of minced plant portions; adjusting the pH of the mass including the pectic enzyme solution and the minced plant portions with hydrochloric acid to a pH of approximately 3.2; adding sulphur dioxide in a quantity sufficient to obtain an approximate sulphur dioxide concentration of 0.0008 gram per 100 cubic centimeters of the mass; stirring the mass at a temperature of approximately 37° C. for approximately 40 hours, whereby the pectic substances enveloping said starch are at least partly dissolved, thus liberating said starch without substantially altering its condition; and separating the thus liberated starch from the remainder of the mass.

11. A method of recovering starch from starch bearing plant material in which the starch is at least partly enveloped by pectic substances, comprising the steps of treating said plant material with pectic enzymes obtained from a culture of a pectic enzyme-producing micro-organism belonging to the group consisting of *Aspergillus aureus, Aspergillus niger, Aspergillus wentii, Botrytis cinera, Penicillium chrysogenum* and *Rhizopus tritici*, whereby the pectic substances enveloping said starch are at least partly dissolved thus liberating the starch without substantially altering its condition; washing the starch from the thus obtained reaction mass so as to obtain a starch-containing wash liquor; separating the starch from the wash liquor; and culturing said pectic enzyme-producing micro-organism in the thus obtained substantially starch-free wash liquor, whereby a regenerated wash liquor containing said pectic enzymes is obtained and can be directly utilized for the digestion of additional starch bearing plant material.

12. A method of recovering starch from starch bearing plant material in which the starch is at least partly enveloped by pectic substances, comprising the steps of treating said plant material with pectic enzymes obtained from a culture of *Aspergillus aureus*, whereby the pectic substances enveloping said starch are at least partly dissolved thus liberating the starch without substantially altering its condition; washing the starch from the thus obtained reaction mass so as to obtain a starch-containing wash liquor; separating the starch from the wash liquor; and culturing said *Aspergillus aureus* in the thus obtained substantially starch-free wash liquor, whereby a regenerated wash liquor containing said pectic enzymes is obtained and can be directly utilized for the digestion of additional starch bearing plant material.

References Cited in the file of this patent

Ward: Encyclopedia of Food, pub. by Artemus Ward, 50 Union Sq., N. Y., 1923, page 509.

Foster: Chemical Activities of Fungi, 1949, Academic Press, N. Y., pages 546 to 551.

Sumner et al.: The Enzymes, vol. 2, part 2, Academic Press, N. Y., 1952, pages 1333, 1334.